(12) United States Patent
Guo et al.

(10) Patent No.: US 10,298,453 B2
(45) Date of Patent: May 21, 2019

(54) ADAPTIVE METHOD AND DEVICE BASED ON FPGA RRU INTERFACE PROTOCOL

(71) Applicant: DATANG MOBILE COMMUNICATIONS EQUIPMENT CO., LTD., Beijing (CN)

(72) Inventors: Feng Guo, Beijing (CN); Qian Li, Beijing (CN); Guijie Geng, Beijing (CN); Di Yang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 256 days.

(21) Appl. No.: 15/311,364

(22) PCT Filed: Mar. 13, 2015

(86) PCT No.: PCT/CN2015/074214
§ 371 (c)(1),
(2) Date: Nov. 15, 2016

(87) PCT Pub. No.: WO2015/180523
PCT Pub. Date: Dec. 3, 2015

(65) Prior Publication Data
US 2017/0118075 A1    Apr. 27, 2017

(30) Foreign Application Priority Data

May 29, 2014  (CN) .......................... 2014 1 0234496

(51) Int. Cl.
*H04L 12/28* (2006.01)
*H04L 12/24* (2006.01)
(Continued)

(52) U.S. Cl.
CPC ......... *H04L 41/0813* (2013.01); *H04W 24/04* (2013.01); *H04W 84/042* (2013.01); *H04W 88/085* (2013.01)

(58) Field of Classification Search
CPC ....................................................... H04L 12/28
(Continued)

(56) References Cited

U.S. PATENT DOCUMENTS 9,345,058 B2 *  5/2016  Erickson ............... H04W 76/10
2012/0250740 A1  10/2012  Ling

FOREIGN PATENT DOCUMENTS

CN    102014463 A    4/2011
CN    102300236 A    12/2011
(Continued)

OTHER PUBLICATIONS

Jun. 12, 2015 Search Report issued in International Patent Application No. PCT/CN2015/074214.

*Primary Examiner* — Dang T Ton
(74) *Attorney, Agent, or Firm* — Oliff PLC

(57) ABSTRACT

Field programmable gate array (FPGA)-based self-adaption method and apparatus for a remote radio unit (RRU) interface protocol. The FPGA includes a type register. The method includes: an RRU loads an FPGA, the FPGA including one or more interface protocol types; the RRU accesses a baseband processing unit (BBU) by using any one of the interface protocol types; the RRU detects the current interface protocol type of the BBU; the RRU records in the type register a corresponding type identifier for the current interface protocol type; and the RRU configures the interface protocol type corresponding to the type identifier. Used for detecting and adjusting an interface protocol, ensuring the uniformity between the protocol and a peer-end device interface protocol, lowering the complexity for implementing normal communication, shortening the reconstruction (Continued)

time that a TD-SCDMA base station is evolved to a TD-LTE base station, and ensuring normal communication of devices in common networking.

14 Claims, 4 Drawing Sheets

(51) Int. Cl.
- *H04W 24/04* (2009.01)
- *H04W 84/04* (2009.01)
- *H04W 88/08* (2009.01)

(58) Field of Classification Search
USPC .......................................................... 370/329
See application file for complete search history.

(56) References Cited

FOREIGN PATENT DOCUMENTS

| | | |
|---|---|---|
| CN | 102612166 A | 7/2012 |
| CN | 104053174 A | 9/2014 |

* cited by examiner

ADAPTIVE METHOD AND DEVICE BASED ON FPGA RRU INTERFACE PROTOCOL

TECHNICAL FIELD

This application involves communication technical field, especially an adaptive method based on FPGA RRU interface protocol and an adaptive device based on FPGA RRU interface protocol.

BACKGROUND TECHNOLOGY

In TD-LTE (Time Division Long Term Evolution), there is a widely used distributed structure consisting of RRU (Radio Remote Unit) and BBU (Building Base band Unit). It is a popular base station system architecture at present.

Currently, when a RRU is connected to BBU via fiber optic based on specific RRU interface protocol, RRU is required to support the need for evolving from TD-SCDMA (Time Division-Synchronization Code Division Multiple Access) standards to TD-LTE standards smoothly. This leads to more types of RRU interface protocol supported by RRU, and normal access on the RRU side needs RRU interface protocols corresponding to BBU. For example, RRUs in current TD-LTE can be connected to BBUs of TD-SCDMA via fiber optic. As they have different communication standards, interface protocol incompatibility exists between RRU and BBU.

Therefore, to address one of the urgent issues, technical researchers in this field proposes an adaptive method and device based on FPGA RRU interface protocol to detect and adjust interface protocol, ensure consistency with peer device interface protocol, reduce complexity of normal communication implementation, shorten the time for transforming TD-SCDMA base station into TD-LTE base station, and ensure normal communication between devices in a common network configuration.

INVENTION CONTENTS

The technical issue to be addressed in this application is providing an adaptive method based on FPGA RRU interface protocol to detect and adjust interface protocol, ensure consistency with peer device interface protocol, reduce complexity of normal communication implementation, and ensure normal communication between devices in a common network configuration.

Accordingly, this application also provides an adaptive device based on FPGA RRU interface protocol.

To address the above issue, this application has published and adaptive method based on FPGA RRU interface protocol. The said FPGA includes type register. The said method includes:

RRU loaded FPGA; the said FPGA includes one or more interface protocol types;

The said RRU adopts any of the said interface protocol types to get access to BBU;

The said RRU detects current interface protocol type of the said BBU;

The said RRU records corresponding type identifier in the said type register for the said current interface protocol type;

The said RRU performs configuration for the interface protocol type corresponding to the said type identifier.

Preferably, the said RRU detects current interface protocol type of the said BBU with the following steps:

The said RRU receives physical layer control word sent by the said BBU;

The said RRU determines type of the said interface protocol.

Preferably, the said RRU determines type of the said interface protocol based on the said physical layer control word with the following steps:

The said RRU acquires data about position of the first preset super group in the said physical layer control word;

The said RRU determines if the said first data is the preset value;

If this is the case, then the said RRU determines the said interface protocol type is the first type.

Preferably, the said RRU detects current interface protocol type of the said BBU with the following steps:

The said RRU acquires RRU identifier about position of second preset super group in the said physical layer control word;

The said RRU determines if the said RRU identifier is the preset RRU;

If this is the case, then the said RRU determines the said interface protocol type is the second type.

Preferably, the said RRU detects current interface protocol type of the said BBU with the following steps:

The said RRU acquires RRU identifier about position of third preset super group in the said physical layer control word;

The said RRU determines if the said RRU identifier is the preset RRU identifier;

If this is the case, then the said RRU determines the said interface protocol type is the third type.

Preferably, the said RRU records corresponding type identifier in the said type register for the said current interface protocol type with the following steps:

The said RRU records first type identifier in the said type register for the said first type; and/or, The said RRU records second type identifier in the said type register for the said second type;

and/or,

The said RRU records third type identifier in the said type register for the said third type;

Preferably, the said first type is a universal public radio interface CPRI protocol, the said second type is LTE-HI interface protocol, and the said third type is TD-IR interface protocol.

The embodiment of this invention has also published an adaptive device based on FPGA RRU interface protocol. The said FPGA includes type register. The said device includes:

Loading module in RRU, configured to load FPGA; The said FPGA includes one or more interface protocol types;

Access module in RRU, configured to adopted any of the said interface protocol type to get access to BBU;

Detection module in RRU, configured to detect current interface protocol type of the said BBU;

Recording module in RRU, configured to records corresponding type identifier in the said type register for the said current interface protocol type;

Configuration module in RRU, configured to performs configuration for interface protocol type corresponding to the said type identifier.

Preferably, the said detection module in RRU includes:

Receiving module in RRU, configured to receive physical layer control word sent by the said BBU;

Determination module in RRU, configured to determine the said interface protocol type based on the said physical layer control word.

Preferably, the said determination module in RRU includes:

First acquisition module in RRU, configured to acquire data about position of first preset super group in the said physical layer control word;

First determination module in RRU, configured to determine if the said first data is preset value; If this is the case, then call first determination module in RRU;

First determination module in RRU, configured to determine if the said interface protocol type is first type.

Preferably, the said determination module in RRU includes:

Second acquisition module in RRU, configured to acquire RRU identifier about position of second preset super group in the said physical layer control word;

Second determination module in RRU, configured to determine if the said RRU identifier is preset RRU; If this is the case, then call second determination module in RRU;

Second determination module in RRU, configured to determine if the said interface protocol type is second type.

Preferably, the said determination module in RRU includes:

Third acquisition module in RRU, configured to acquire RRU identifier about position of third preset super group in the said physical layer control word;

Third determination module in RRU, configured to determine if the said RRU identifier is preset RRU identifier; If this is the case, then call third determination module in RRU;

Third determination module in RRU, configured to determine if the said interface protocol type is third type.

Preferably, the said recording module in RRU includes:

First recording module in RRU, configured to record first type identifier in the said type register for the said first type;

and/or,

Second recording module in RRU, configured to record second type identifier in the said type register for the said second type;

and/or,

Third recording module in RRU, configured to record third type identifier in the said type register for the said second type.

The embodiment of this invention has also published a computer readable recording medium used to record programs for executing the said method on it.

Compared to existing technologies, this application provides the following advantages:

In the embodiment of this invention, after adopting the protocol type in FPGA to get access to BBU, RRU detects the BBU current interface protocol type, and records corresponding type identifier in the register based on current interface protocol type. RRU performs configuration for interface protocol type corresponding to that type identifier to meet peer BBU requirements, ensure consistency with interface protocol of peer device, reduce complexity for implementing normal communication, and ensure normal communication of devices in common network configuration.

In the embodiment of this invention, after the access to BBU is established, the system performs detection based on information sent by BBU, and makes adjustment based on detection results. This enables RRU to get adapted to current RRU interface protocol. The short user service interruption avoids disturbance to normal use and contributes to better user experience. There is no need to change interface protocol type information between RRU and BBU manually. The time for transforming TD-SCDMA base station to TD-LTE base station is shortened, and both labor cost and resource consumption are reduced.

In the embodiment of this invention, as current resources can be used directly, resource waste can be avoided. Information sent by BBU is used as the basis for determining current interface protocol to reduce complexity for implementing normal communication and FPGA design. In addition, the embodiment of this invention is not specific to a certain system. Rather, it supports a number of communication standards and interface protocols. Restrictions on external devices are reduced due to simplicity and easy implementation. It should be noted that the embodiment of this invention also supports interface protocol detection and adjustment when a BBU is connected to a BBU on the same or a higher level.

SPECIFIC IMPLEMENTATION

To make one of the above purposes of this application, its characteristics, and advantages more clearly understandable, further description about this application is given below with figures and specific implementation.

Figure 1:
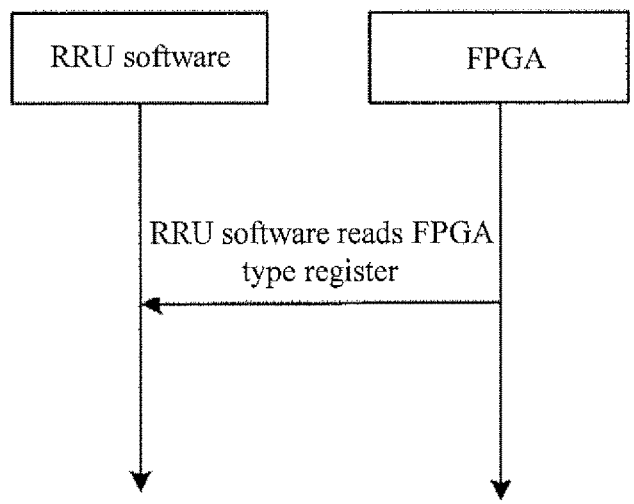
FIG. 1 is the diagram of a method for adjusting RRU interface protocol in the TD-LTE base station.

Currently there are mainly to methods to achieve interface protocol configuration between RRU and BBU:

1) A solidified interface protocol is used between BBU and RRU. FIG. 1 is the diagram of a method for adjusting RRU interface protocol in the TD-LTE base station. In this method, the interface protocol is already solidified when the FPGA (Field Programmable Gate Array) version is created in RRU, and set flags in the corresponding register. RRU software, by acquiring type register in FPGA to configure message type on the software side so that RRU can be connected as a solidified interface protocol type. When the interface type on BBU side changes, FPGA on RRU side needs to change its version to ensure interface protocol consistency on BBU side.

Figure 2:
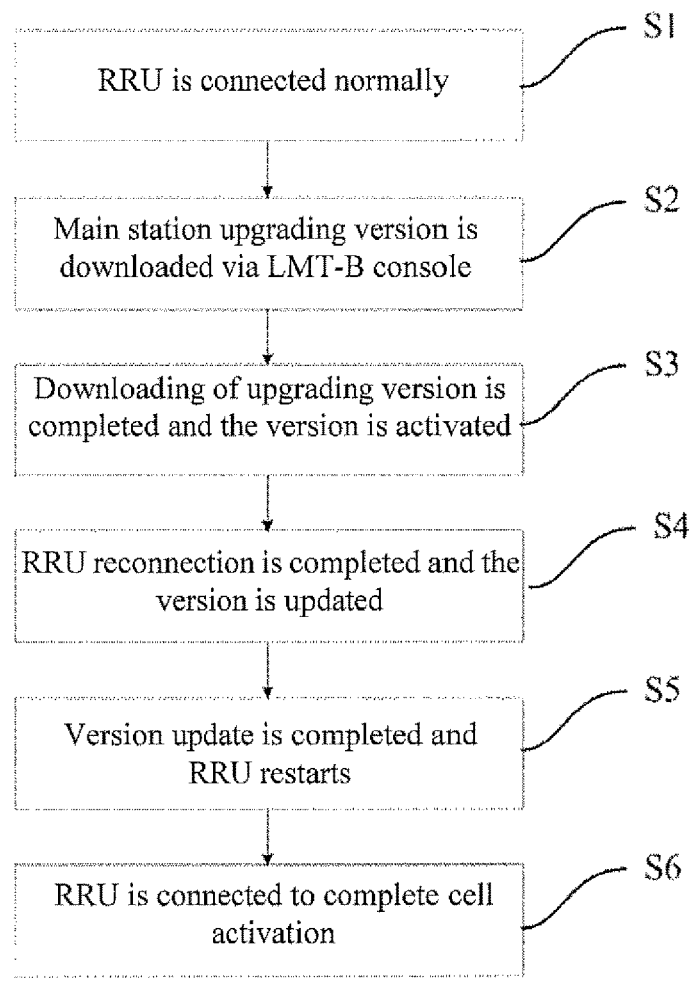
FIG. 2 is the flow chart for changing RRU software package for RRU interface protocol configuration.

2) RRU software package is changed to complete RRU interface protocol configuration. FIG. 2 is the flow chart for changing RRU software package for RRU interface protocol configuration. Transmission protocol configuration is performed through remote update of RRU software. The method is used with the following steps:

S1: RRU adopts the original transmission protocol to get access to BBU normally;

S2: RRU controls LMT-B (NodeB Local Maintenance Terminal, local maintenance management system of the base station) to download upgraded RRU software package via existing transmission protocol;

S3: After downloading of upgraded version of RRU software package, RRU software package update is triggered through manual control;

S4: RRU is reconnected to BBU trigger software version update on BBU side;

S5: After software version update on BBU side, RRU restarts;

S6: After both RRU and BBU have completed software update, when RRU is reconnected, RRU is found to be connected with the desired transmission protocol. The cells are re-activated to provide services.

As in the first method, the interface protocol between BBU and RRU is solidified, i.e. the interface protocol of RRU is solidified. The interface protocol used by BBU has to be determined, and then the specific protocol type on RRU side needs to be determined. This means a dual-mode RRU can only be connected to a BBU supporting TD-LTE interface protocol, and can't be connected to existing TD-SCDMA single-mode BBU. Also, existing TD-SCDMA single-mode RRU can only be connected to TD-SCDMA single-mode BBU, and can't be connected to newly developed dual-mode BBU. During evolution from TD-SCDMA standards to TD-LTE standards, labor cost and resource consumption of existing TD-SCDMA base station transformation will be increased. In the second method, the RRU software package is changed to perform RRU interface protocol configuration. Although this method solves the issue of high labor cost consumption of the first method, it needs to upgrade the version of BBU and RRU. However, due to model reset operation of base station, the cells may fail to provide normal services for long. This will cause long-term interruption of user service and use.

To solve the above issue, the inventor of this patent creatively proposes one of the core concepts of the embodiment of this invention: After adopting protocol type in FPGA to get access to BBU, FPGA detects BBU current interface protocol type, and records corresponding type identifier in the register based on current interface protocol type. RRU then performs configuration for the interface protocol type corresponding to that type identifier to meet peer BBU needs, shorten the time for transforming TD-SCDMA base station into TD-LTE base station, ensure consistency with interface protocol of peer device, reduce complexity for implementing normal communication, and ensure normal communication between devices in a common network configuration.

First Embodiment

Figure 3:
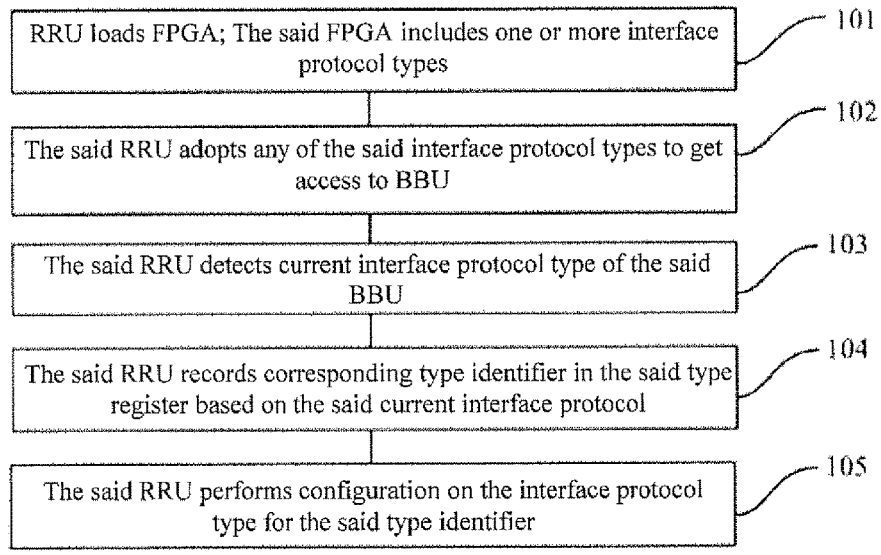
FIG. 3 is the flow chart of the embodiment for an adaptive method based on FPGA RRU interface protocol in this application.

FIG. 3 gives the flow chart of the embodiment for an adaptive method based on FPGA RRU interface protocol in this application. The said FPGA can include type register. The said method can include the following steps:

Step 101: RRU loaded FPGA; The said FPGA includes one or more interface protocol type;

In specific implementation, the said FPGA stores information about multiple interface protocol types, which may include TD-SCDMA and TD-LTE interface protocol. During start of RRU, RRU software completes FPGA loading. FPGA works in default interface protocol type.

Step 102: The said RRU adopts any of the said interface protocol type to get access to BBU;

In a preferred embodiment of this application, an old interface protocol for mutual communication between RRU and BBU is installed, and a default interface protocol is configured in PPGA. If RRU is to be connected to BB, a default interface protocol is first used to get access to BBU to achieve normal communication between RRU and BBU, to acquire interface protocol information of corresponding BBU, and to adjust RRU local interface protocols adaptively.

Step 103: The said RRU detects current interface protocol type of the said BBU;

In a preferred embodiment of this application, the said Step 103 can include the following substeps:

substep S11: The said RRU receives physical layer control word sent by the said BBU;

substep S12: The said RRU determines type of the said interface protocol based on the said physical layer control word.

In actual applications, when a default interface protocol is used between RRU and BBU for communication, RRU receives physical layer control word sent by BBU, and RRU FPGA automatically detects that physical layer control word, and determines interface protocol type based on detection results.

In a preferred embodiment of this application, the said substep S12 can include the following substeps:

Substep S12-11: The said RRU acquires data about position of the first preset super group in the said physical layer control word;

Substep S12-12: The said RRU determines if the said first data is the preset value; If this is the case, then it executes substep S12-13;

Substep S12-13: The said RRU determines if the said interface protocol type is the first type.

In a preferred embodiment of this application, the said substep S12 can include the following substeps:

Substep S12-21: The said RRU acquires RRU identifier about position of second preset super group in the said physical layer control word;

Substep S12-22: The said RRU determines if the said RRU identifier is preset RRU; If this is the case, then it executes substep S12-23;

Substep S12-23: The said RRU determines if the said interface protocol type is second type.

In a preferred embodiment of this application, the said substep S12 can include the following substeps:

Substep S12-31: The said RRU acquires RRU identifier about position of third preset super group in the said physical layer control word;

Substep S12-32: The said RRU determines if the said RRU identifier is preset RRU identifier; If this is the case, then it executes substep S12-33;

Substep S12-33: The said RRU determines if the said interface protocol type is third type.

Step 104: The said RRU records corresponding type identifier in the said type register for the said current interface protocol type;

In a preferred embodiment of this application, the said Step 104 can include the following substeps:

Substep S21: The said RRU records first type identifier in the said type register for the said first type;

and/or, substep S2: The said RRU records second type identifier in the said type register for the said second type; and/or, Substep S23: The said RRU records third type identifier in the said type register for the said third type.

Step 105: The said RRU performs configuration for the interface protocol type corresponding to the said type identifier.

In specific implementation, after normal communication between RRU and BBU, FPGA automatically detects actually connected BBU interface protocol type, and sets flags in the register based on that interface protocol type. RRU software determines interface protocol type of the currently connected BBU by reading the flags in the FPGA register. Finally, the software completes all relevant configurations on RRU side based on this interface protocol type.

To help technical personnel in this field further understand the embodiment of this invention, specific embodiments are used below for description.

Figure 4:
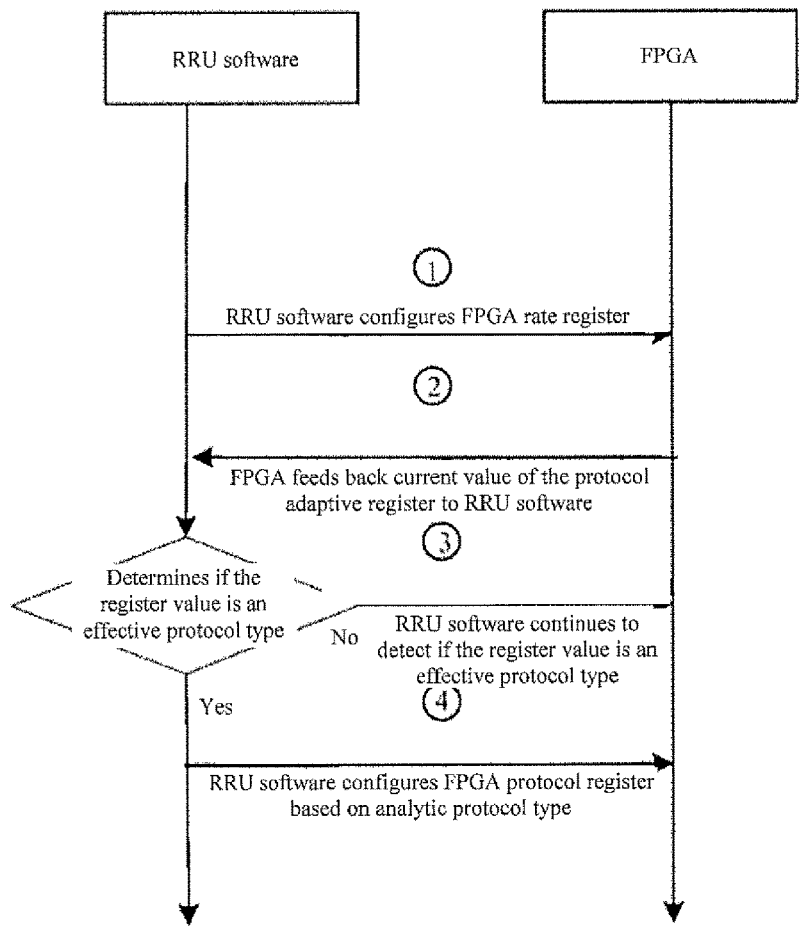
FIG. 4 is a RRU interface protocol adaptation flow chart in this application.

In the embodiment of this invention, FPGA is used to perform real-time detection on the current RRU interface protocol and to achieve dynamic adjustment of RRU interface protocol. FIG. 4 is a RRU interface protocol adaptation flow chart in this application. FPGA includes an interface protocol type that enables normal communication between RRU and BBU. The specific steps are given below:

Step 1: During RRU start, the software completes FPGA loading and causes FPGA to operate in default interface protocol type. At this point, FPGA takes the value of the interface protocol adaptive register, i.e. the type register, as 0x0 by default (invalid protocol).

Step 2: RRU FPGA receives information sent by BBU in the default interface protocol type, automatically detects actually connected protocol type based on this information, and make flags in the adaptive register. FPGA feeds back current value of the protocol adaptive register to RRU software. After receiving this value, RRU software reads value of the adaptive register, and determines if the current interface protocol type from BBU is an effective interface protocol type. If this is the case, then it executes step 4, otherwise it executes step 3.

Step 3: RRU software completes relevant configurations in FPGA protocol register on RRU side based on this interface protocol type.

Step 4: Step 2 is repeated. RRU software continues to detect if the register value is an effective protocol type.

Figure 5:
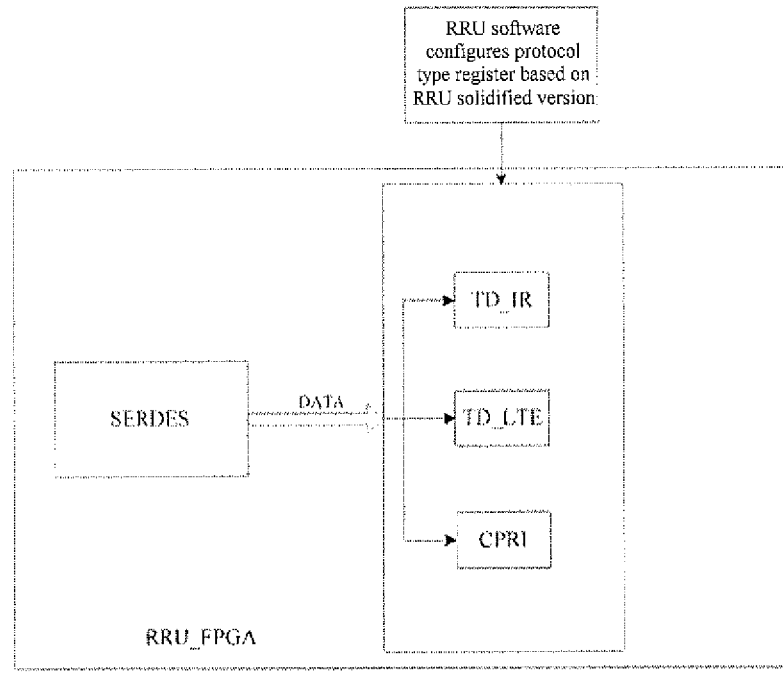
FIG. 5 is the diagram of internal module structure for a FPGA solidified protocol type used in existing technologies.

FIG. 5 gives the diagram of internal module structure for a FPGA solidified protocol type used in existing technologies. In RRU_FPGA, SERDES (SERializer/DESerializer) receives data from peer devices. RRU software can only configure interface protocol type register based on the interface protocol solidified in RRU beforehand.

Figure 6:
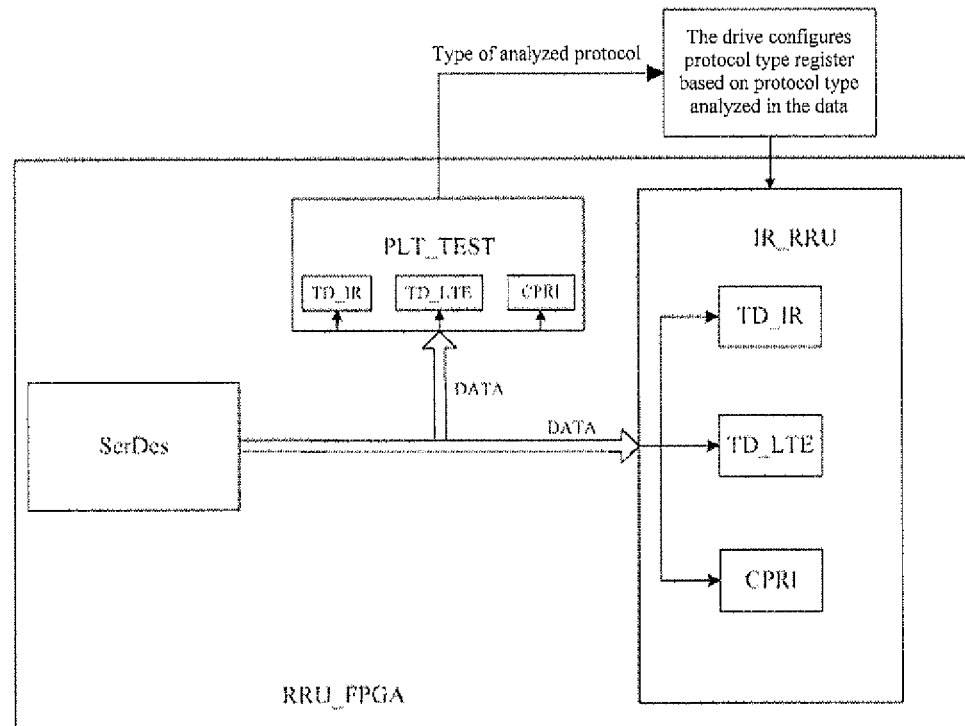
FIG. 6 is the diagram of internal module structure for a FPGA detection protocol type in this application.

In the embodiment of this invention, and interface protocol test module is added in RRU to detect and adjust RRU interface protocol based on data received by SERDES. FIG. 6 gives the diagram of internal module structure for a FPGA detection protocol type in this application. In RRU_FPGA, a RRU interface protocol real-time detection module PLT_TEST is added to achieve RRU interface protocol real-time test function under matching transmission rates. RRU software is notified of current RRU interface protocol via the software interface, and then RRU software configures RRU interface protocol mode.

Specifically, PLT_TEST consists of the following three modules: TD-IR protocol real-time analytic module, LTE protocol real-time analytic module, and CPRI protocol real-time analytic module. It should be noted that in TD-SCDMA, each time slot consists of multiple 25S super groups, and there are 32 groups in each super group. Each group contains 24 words. In a super group, the first byte of the first group serves as the synchronization word k28.5, and the second byte is used to transmit SGN (Super Group Number).

Figure 7:
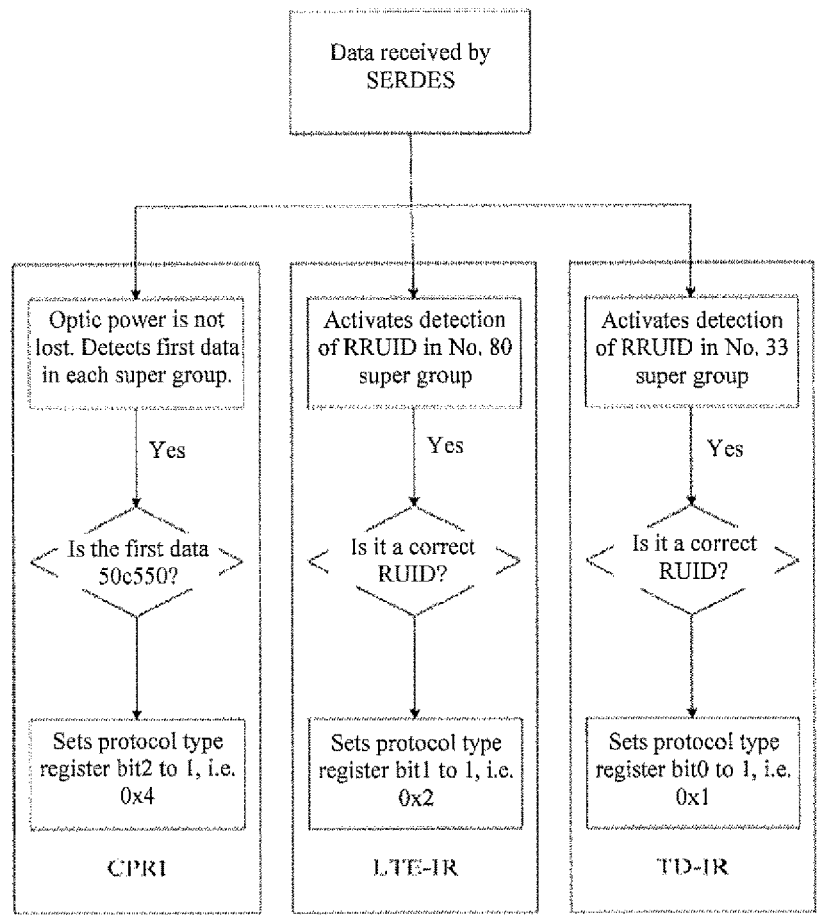
FIG. 7 is the flow chart of an interface protocol detection in FPGA in this application.

FIG. 7 is the flow chart of an interface protocol detection in FPGA in this application. In FPGA version, protocol adaptive register value is taken as 0x0 by default (invalid protocol). After receiving data, SERDES sends the data to TD-IR protocol real-time analytic module, LTE protocol real-time analytic module, and CPRI protocol real-time analytic module respectively. After receiving data from SERDES, the above three modules perform detection on the data respectively. The detection steps of the three modules are given below:

TD-IR protocol real-time analytic module:

Based on data received by TD-IR protocol frame structure analytic downlink, it begins to analyze content of the physical layer control word from Number 33 super group RRUID. After completion of analysis, it checks the data based on TD-HI protocol. After successful checking, the first bit of the type register in FPGA and RRU will be set to 1. For example, type register bit0 is set to 1, i.e. 0x1.

LTE-IR protocol real-time analytic module:

Based on data received by LTE-IR protocol frame structure analytic downlink, LTE begins to analyze content of physical layer control word from Number 89 super group RRUID. After completion of analysis, data is checked based on LTE-HI protocol. After successful checking, the second bit of the type register in FPGA and RRU software will be set to 1. For example, the type register bit 1 is set to 1, i.e. 0x2.

CPRI protocol real-time analytic module:

Based on data received by CPRI protocol frame structure analytic downlink, if it is detected that the 24-bit data coming next to K28.5synchronous word is 0x50c550, then the current link transmission protocol is CPRI. At this point, the third bit of the type register in FPGA and RRU software is set to 1. For example, the type register bit2 is set to 1, i.e. 0x3.

In actual use, after normal loading in FPGA, RRU software begins to detect status of the optic module, and then configures FPGA SERDES rate and delay waiting. At this point, FPGA begins to detect current RRU interface protocol type in real time. The received link data is sent to TD-IR protocol real-time analytic module, LTE-IR protocol real-time analytic module, and CPRI protocol real-time analytic module at the same time. These three modules are configured to perform parallel real-time analysis on link data based on TD-IR protocol, LTE-IR protocol, and CPRI protocol. Of course, RRU can make adjustment based on other interface protocols, which are not restricted in this application embodiment.

In the embodiment of this invention, three types of interface protocols are realized for ﬀ RRU real-time analysis. The low data receiving delay feature of FPGA internal detection optic interfaces is used. Specifically, real-time analysis of the super group number where RRUID is located in the physical layer control word allows determination of RRU current operating interface protocol type. RRU software completes optic interface protocol configuration flow based on interface protocol type submitted by FPGA. It can support protocol adaptive functions for the following three standard protocols: Technical Requirements for Ir Interface in TD-SCDMA Digital Honeycomb Mobile Communication Network Distributed Base Station, Technical Requirements for Ir Interface in TD-LTE Honeycomb Mobile Communication Network Distributed Base Station, and CPRI interface.

In sum, the embodiment of this invention provides the following advantages compared to existing technologies:

1. Automatic detection and adjustment of RRU interface protocols.

2. As TD-SCDMA base station evolves and upgrades to TD-LTE base station smoothly, the operators continue to shorten the business interruption time due to evolution and upgrading. Based on requirements for fusion and networking between TD-LTE base station and FDD-LTE base station, RRU can get access to BBU automatically based on current RRU interface protocol. RRUs using this technology can meet operator needs for minimizing business interruption time during upgrading and evolution, reduce complexity for implementing normal communication, and decrease labor cost and resource consumption.

3. Detection and adjustment of interface protocol when a BBU is connected to another BBU on the same or a higher level.

It should be noted that for simple description, the method embodiment has been represented as a series of action combinations. However, the technical personnel in this field should know that this application is not restricted by the sequence of the represented actions, as some steps can be re-arranged in sequence or conducted at the same time based on this. The technical personnel in this field should also know that all embodiments described in the specification are preferred ones, and the actions involves are not necessarily required for this application.

Second Embodiment

Figure 8:
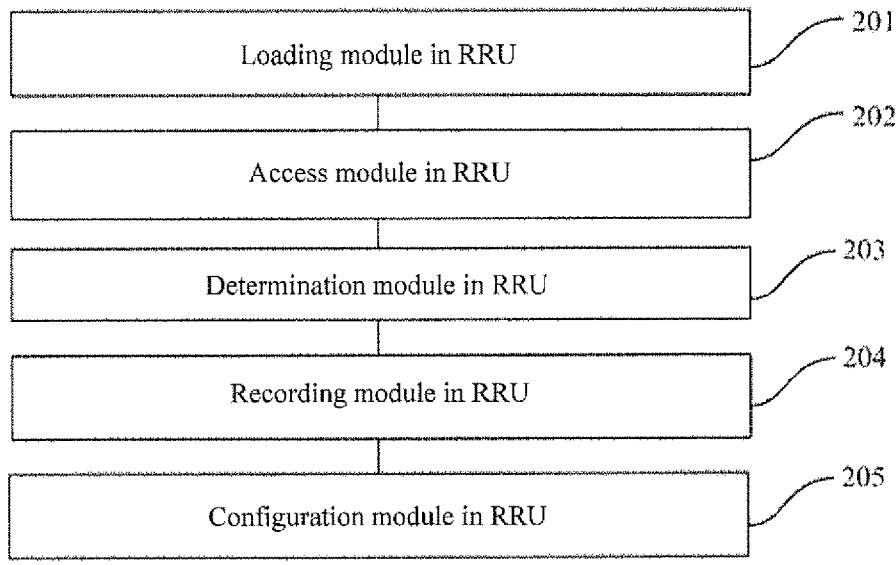
FIG. 8 is the block diagram of the embodiment for an adaptive device based on FPGA RRU interface protocol in this application.

FIG. 8 gives the block diagram of the embodiment for an adaptive device based on FPGA RRU interface protocol in this application. The said FPGA can include type register. The said device can include the following module:

A loading module in RRU 20, configured to load FPGA. The said FPGA includes one or more interface protocol types;

Access module 202 in RRU, configured to use any of the said interface protocol type to get access to BBU;

Detection module 203 in RRU, configured to detect current interface protocol type of the said BBU;

In a preferred embodiment of this application, detection module 203 in the said in RRU can include:

Receiving module in RRU, configured to receive physical layer control word sent by the said BBU;

Determination module in RRU, configured to determine the said interface protocol type based on the said physical layer control word.

In a preferred embodiment of this application, the said determination module in RRU can include:

First acquisition module in RRU, configured to acquire data about position of first preset super group in the said physical layer control word;

First determination module in RRU, configured to determine if the said first data is preset value; If this is the case, then call first determination module in RRU;

First determination module in RRU, configured to determine if the said interface protocol type is the first type.

In a preferred embodiment of this application, the said determination module in RRU can include:

Second acquisition module in RRU, configured to acquire RRU identifier about position of the second preset super group in the said physical layer control word;

Second determination module in RRU, configured to determine if the said RRU identifier is preset RRU; If this is the case, then call second determination module in RRU;

Second determination module in RRU, configured to determine if the said interface protocol type is second type.

In a preferred embodiment of this application, the said determination module in RRU can include:

Third acquisition module in RRU, configured to acquire RRU identifier about position of the third preset super group in the said physical layer control word;

Third determination module in RRU, configured to determine if the said RRU identifier is preset RRU identifier; If this is the case, then call third determination module in RRU;

Third determination module in RRU, configured to determine if the said interface protocol type is third type.

Recording module 204 in RRU, configured to record corresponding type identifier in the said type register for the said current interface protocol type;

In a preferred embodiment of this application, the said recording module 204 in RRU can include:

First recording module in RRU, configured to record first type identifier in the said type register for the said first type; and/or, Second recording module in RRU, configured to record second type identifier in the said type register for the said second type;

and/or,

Third recording module in RRU, configured to record third type identifier in the said type register for the said third type.

Configuration module 205 in RRU, configured to perform configuration for the interface protocol type corresponding to the said type identifier.

Description of device embodiments is simple as they are quite similar to method embodiments. Relevant details can be found in the corresponding description about method embodiments.

Third Embodiment

The embodiment of this invention has also published a computer readable medium where computer readable programs for executing the said method are recorded.

The said computer readable recording medium includes any mechanism used to store or transmit information in computer (such as PC) readable forms. For example, computer readable medium includes ROM, RAM, disk storage medium, optic storage medium, flash medium, electric, optic, or other transmission signals (e.g. carrier, IR signal, digital signal, etc).

All embodiments in this specification are described progressively. Description of each embodiment focuses on differences with other embodiments, while common and similar elements can be shared between them.

Technical personnel in this field should understand that embodiments in this application can be provided as a method, device, computer program product. Therefore, this application can adopt full hardware embodiment, full software embodiment, or a combination of both. In addition, this application can adopt computer program product forms implemented on one or more computer usable storage media that contains computer usable program codes (including but not limited to disk storage, CD-ROM, optic storage, etc).

This application is described with reference to flow charts and/or block diagrams of methods, devices (systems), and computer program products based on the embodiment of this invention. It is understandable that computer program instructions can be used to implement each flow and/or block in the flow charts and/or block diagrams as well as combinations of flows and/or blocks in the flow charts and/or block diagrams. These computer program instructions can be provided for general computer, special computer, embedded processor, or other programmable data processing unit to generate a machine so that instructions created by a computer or a processor of other programmable data processing units can be used to implement device with designated functions in one or more flows in the flow charts and/or one or more blocks in the block diagrams.

These computer program instructions can also be stored in computer readable storage devices that can instruct a computer or other programmable data processing units to operate in specific ways so that the instructions stored in such computer readable storage devices can generate products including the instruction device. This instruction device implements designated functions in one or more flows in the flow charts and/or one or more blocks in the block diagrams.

These computer program instructions can also be loaded to a computer or other programmable data processing units so that a series of operation steps are executed in the computer or other programmable data processing units to provide computer processing. In this way, the instructions executed in the computer or other programmable data processing units are provided to implement steps for designated functions in one or more flows in the flow charts and/or one or more blocks in the block diagrams.

Although preferred embodiments of this application have been described, technical personnel, after learning basic creative concepts, can make other changes and modifications to these embodiments. Hence, the attached claims is intended to be interpreted as including preferred embodiments and all changes and modifications falling into the range of this application.

Finally, it should be noted that in this document, relation terms like "first" and "second" are only used to differentiate one entity or operation from another, and not necessarily to require or imply existence of any of such relations or sequences between these entities or operations. Besides, terms "include", "contain", or any other variants are intended to cover non-exclusive inclusion relations. This means processes, methods, substances, or devices that include a series of elements contain both those element and other elements that have not been explicitly listed, or even intrinsic elements of such processes, methods, substances, or devices. Without further restrictions, elements restricted by sentence "including one" do not exclude the possibility that other similar elements exist in the processes, methods, substances, or device containing the said element.

An adaptive method based on FPGA RRU interface protocol and an adaptive device based on FPGA RRU interface protocol for this application are described above. Specific embodiments are used in this document to describe principle and implementation method of this application. The above embodiments are only given to help understand method and core concepts of this application. In the meanwhile, for general technical personnel in this field, based on concepts of this application, specific implementations and application ranges can be changed. In sum, contents of this specification should not be regarded as restrictions to this application.

The invention claimed is:

1. An adaptive method based on a field programmable gate array (FPGA) remote radio unit (RRU) interface protocol of an RRU loaded FPGA, the FPGA including a type register and at least one interface protocol type, the method comprising:
    adopting, by an RRU, any of the at least one interface protocol type to get access to a baseband unit (BBU);
    detecting, by the RRU, a current interface protocol type of the BBU;
    recording, by the RRU, a corresponding type identifier in the type register based on the current interface protocol type;
    performing, by the RRU, configuration for the interface protocol type corresponding to the type identifier,
    wherein the step of the RRU detecting the current interface protocol type of the BBU includes:
        receiving a physical layer control word sent by the BBU; and
        determining a type of the interface protocol based on the physical layer control word; and
    wherein the step of the RRU determining the type of the interface protocol based on the physical layer control word includes:
        acquiring data about a position of a first preset super group in the physical layer control word;
        determining whether the first data is a preset value; and
        if the RRU determines that the first data is the preset value, then the RRU determines whether the interface protocol type is a first type of interface protocol.

2. The method according to claim 1, wherein the step of the RRU detecting the current interface protocol type of the BBU includes:
    acquiring an RRU identifier of a position of a second preset super group in the physical layer control word;
    determining whether the RRU identifier is a preset RRU; and
    if the RRU determines that the RRU identifier is the preset RRU, then the RRU determines whether the interface protocol type is a second type of interface protocol.

3. The method according to claim 2, wherein the step of the RRU detecting the current interface protocol type includes:
    acquiring an RRU identifier of a position of a third preset super group in the physical layer control word;
    determining whether the RRU identifier is the preset RRU identifier; and
    if the RRU determines that the RRU identifier is the preset RRU identifier then the RRU determines whether the interface protocol type is a third type of interface protocol.

4. The method according to claim 1, wherein the step of the RRU recording the corresponding type identifier in the type register for the current interface protocol type includes at least one of the following steps:
    recording a first type identifier in the type register for the first type of interface protocol;
    recording a second type identifier in the type register for a second type of interface protocol; and
    recording a third type identifier in the type register for a third type of interface protocol.

5. The method according to claim 4, wherein
    the first type of interface protocol is a common public radio interface (CPRI) protocol,
    the second type of interface protocol is a long term evolution-infrared (LTE-IR) interface protocol, and
    the third type of interface protocol is a time division-infrared (TD-IR) interface protocol.

6. An adaptive device based on a field programmable gate array (FPGA) remote radio unit (RRU) interface protocol, the adaptive device comprising:
    an FPGA including a type register and at least one interface protocol type;
    an RRU programmed to:
        load the FPGA;
        adopt any of the at least one interface protocol type to get access to a baseband unit (BBU);
        detect a current interface protocol type of the BBU;
        record a corresponding type identifier in the type register for the current interface protocol type; and perform configuration for the interface protocol type corresponding to the type identifier;
receive a physical layer control word sent by the BBU;
determine the interface protocol type based on the physical layer control word;
acquire data about a position of the first preset super group in the physical layer control word;
determine whether the first data is a preset value; and
if the RRU determines that the first data is the preset value, then determine whether the interface protocol type is a first type of interface protocol.

7. The device according to claim 6, wherein the RRU is further programmed to:
acquire an RRU identifier of a position of a second preset super group in the physical layer control word;
determine whether the RRU identifier is a preset RRU; and
if the RRU determines that the RRU is the preset RRU, then determine whether the interface protocol type is a second type of interface protocol.

8. The device according to claim 7 wherein the RRU is further programmed to:
acquire an RRU identifier of a position of a third preset super group in the physical layer control word;
determine whether the RRU identifier is a preset RRU; and
if the RRU determines that the first data is the preset value, then determine whether the interface protocol type is a third type of interface protocol.

9. The device according to claim 6, wherein the RRU is further programmed to execute at least one of the following:
record a first type identifier in the type register for the first type of interface protocol;
record a second type of identifier in the type register for a second type of interface protocol; and
record a third type identifier in the type register for a third type of interface protocol.

10. A non-transitory computer readable recording medium used to record programs for executing the method according to claim 1 thereon.

11. The method according to claim 2, wherein the step of the RRU recording the corresponding type identifier in the type register for the current interface protocol type includes at least one of the following steps of:
recording a first type identifier in the type register for the first type of interface protocol;
recording a second type identifier in the type register for the second type of interface protocol; and
recording a third type identifier in the type register for a third type of interface protocol.

12. The method according to claim 3, wherein the step of the RRU recording the corresponding type identifier in the type register for the current interface protocol type includes at least one of the following steps:
recording a first type identifier in the type register for the first type of interface protocol;
recording a second type identifier in the type register for a second type of interface protocol; and
recording a third type identifier in the type register for a third type of interface protocol.

13. The device according to claim 7, wherein the RRU is further programmed to execute at least one of the following:
record a first type identifier in the type register for the first type of interface protocol;
record a second type identifier in the type register for the second type of interface protocol; and
record a third type identifier in the type register for the third type of interface protocol.

14. The device according to claim 8, wherein the RRU is further programmed to execute at least one of the following:
record the first type identifier in the type register for the first type of interface protocol;
record a second type identifier in the type register for the second type of interface protocol; and
record a third type identifier in the type register for a third type of interface protocol.

* * * * *